Nov. 27, 1951
F. E. STUART
2,576,198
WINDSHIELD SPRAYER
Filed Feb. 10, 1949
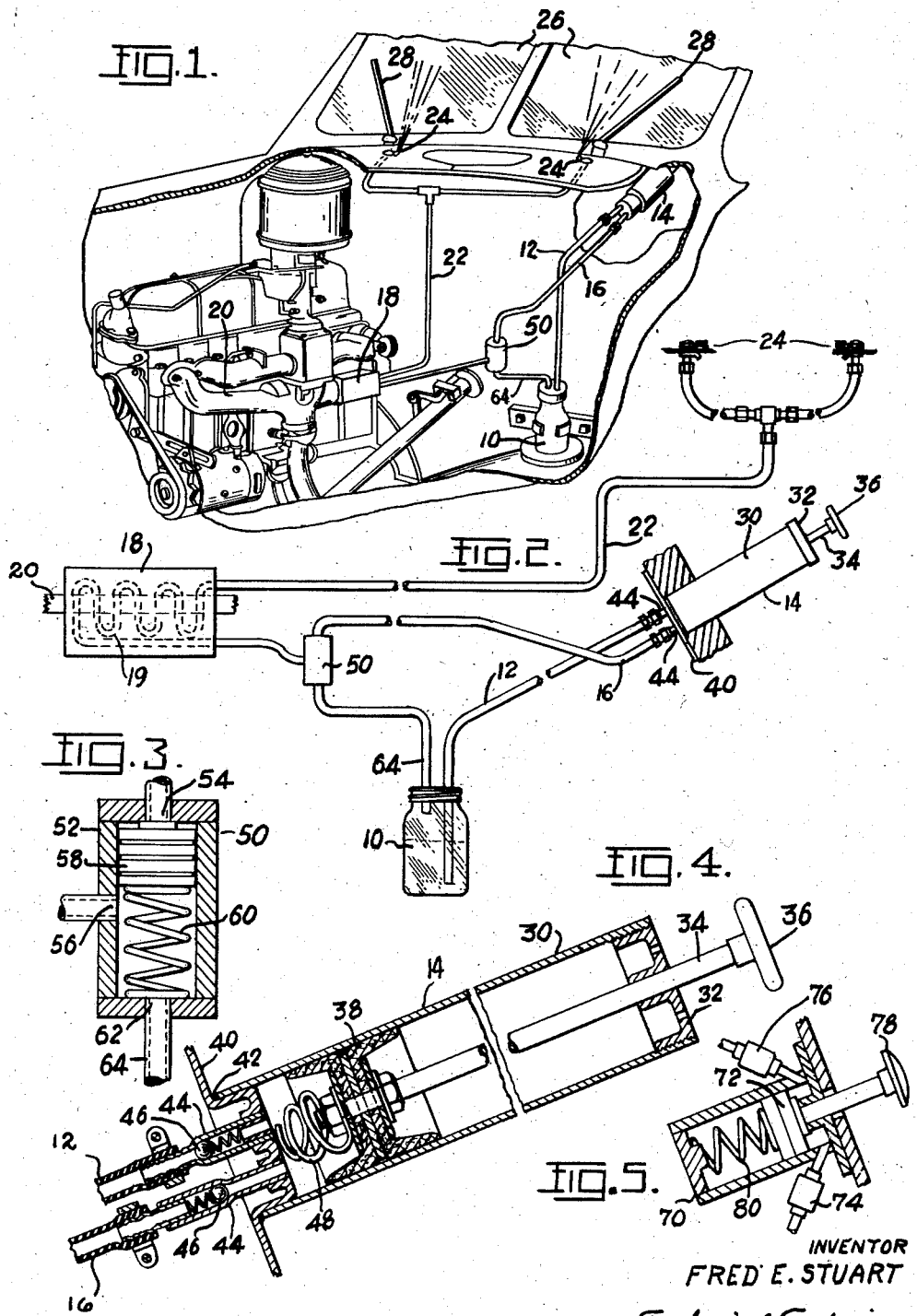
INVENTOR
FRED E. STUART
Toulmin & Toulmin
ATTORNEYS Patented Nov. 27, 1951

2,576,198

UNITED STATES PATENT OFFICE 2,576,198

WINDSHIELD SPRAYER

Fred E. Stuart, Baltimore, Md., assignor to The Commonwealth Engineering Company of Ohio, Dayton, Ohio, a corporation of Ohio Application February 10, 1949, Serial No. 75,587

3 Claims. (Cl. 20—40.5)

This invention relates to improvements in windshield cleaning devices, and particularly to improvements in such devices which deliver a stream or spray of fluid to the windshield, or windshields, to be cleaned, which is effective, upon operation of the windshield wipers for assisting in cleaning foreign matter therefrom.

Windshield cleaning devices which direct a spray or stream of water through nozzles against the windshield adjacent the windshield wiper blades to facilitate the cleaning of the windshield are well-known in the art but have certain inherent faults which materially detract from their utility.

In general, such devices include a container for the liquid to be sprayed onto the windshield, a pump, usually vacuum operated, associated with the container, and nozzles or spray heads adjacent the windshield areas to be sprayed and through which the aforementioned pump forces the liquid. One of the disadvantages of this type of arrangement is that the liquid is cold when delivered to the windshield. This materially detracts from the cleaning properties of the liquid, and much foreign matter, such as road tar and greases is substantially impervious to cold water and cannot quickly be removed in this manner. Another fault with a cold water system of this nature is that sleet, snow and ice are not readily melted thereby, and, in fact, the cleaning liquid itself may even freeze on the windshield unless additives are placed in the liquid container which lower the freezing point of the liquid.

Still another disadvantage which obtains with the usual type cold water windshield cleaning system, is that there is a possibility, in severe weather, of the liquid freezing within the tube leading from the pump to the nozzles at the windshield. This, of course, would render the device wholly inoperative.

The primary object of the instant invention is to provide a windshield cleaning device, including means for spraying liquid onto the windshield, which overcomes the foregoing drawbacks of prior art mechanisms.

A particular advantage of the present invention is the provision of a system for spraying steam or hot water against the windshield to be cleaned, whereby the effectiveness of the cleaning cycle is greatly enhanced.

Still another object is the provision of an arrangement for the wet cleaning of a windshield while the vehicle is in operation which requires the shortest possible time to complete the cleaning cycle, thereby reducing the hazard of having the windshield partially obscured.

Still another object of this invention is the provision of a windshield cleaning arrangement including a container for liquid and means for pumping the liquid to the windshield to be cleaned in which no liquid stands in the connections between the liquid container and the nozzles at the windshield.

Another object of this invention is the provision of a liquid spray type windshield cleaning arrangement which is adaptable for substantially any type of vehicle, such as automobiles, trucks, and trolley buses and street cars.

Still another object of this invention is the elimination of the usual expensive vacuum pump from a liquid spray type windshield cleaning device.

These and other objects and advantages will become more apparent upon reference to the following description taken in connection with the accompanying drawings, in which:

Figure 1 is a perspective view showing a windshield cleaning device according to my invention attached to the ordinary type of automotive vehicle or truck;

Figure 2 is a diagrammatic view showing the system itself somewhat more in detail;

Figure 3 is an enlarged sectional view through the by-pass valve which drains the conduits of the system after a cleaning operation is completed;

Figure 4 is a sectional view showing one type of pump adapted for being used in the system of this invention; and Figure 5 is a sectional view showing another type of pump adapted for replacing that shown in Figure 4.

Referring to the drawings somewhat more in detail, Figure 1 diagrammatically illustrates the application of a windshield cleaning system according to my invention to the usual type automotive vehicle, such as a passenger car or truck. The system includes a reservoir or container at 10 which holds the liquid, usually water, which is to be sprayed onto the windshield. This container can be located in any convenient place within the car, and, as shown, may be carried on the back of the cowl or fire-wall at the front of the vehicle cab.

A suction conduit 12 leads into the container and is connected to the suction side of a hand-operated pump 14. This pump is located so that the operator of the vehicle can readily grasp the handle thereof and place the system into operation. The discharge side of the pump is connected by conduit 16 with a heat exchanger or flash steam unit which is mounted adjacent the exhaust manifold 20 of the vehicle engine.

The vaporizer 18 may be bolted directly against the exhaust manifold in order to place it in good thermal contact therewith, or may be otherwise associated with the exhaust system of the vehicle so that the water passing through the unit 18 can be brought to a boil. The unit preferably has a coil, as shown at 19, for obtaining as much area as possible for the quick transfer of heat to the liquid in passing through the unit.

The discharge side of the unit 18 is connected by a conduit 22 with one or more spray heads, as indicated at 24, and which are so arranged that the fluid issuing therefrom is directed against the proper part of the surfaces of the windshields 26.

Mounted in the usual manner are the windshield wiper blades 28, and which are operable to wipe liquids from the windshields, so that after they have been sprayed, the windshield wipers can be set into operation and wipe the liquid and the loosened foreign matter from the windshield surfaces.

It might be noted at this time that the manner of operation of the pump 14 controls to a certain degree the temperature of the spray directed to the windshields. If the pump is operated slowly, the liquid passes through the unit 18 slowly enough to pick up considerable heat, and the spray which issues is hot and at least partially vaporized. On the other hand, if the pump is operated rapidly, then the liquid passes through the unit 18 rapidly, and the spray directed to the windshields is at a lower temperature.

The location and mounting of the unit 18 is also of considerable effect in determining the temperature of the sprays, and climatic conditions and individual preference will regulate the actual location of this unit and the manner of operation of the hand pump.

The heating of the liquid to be sprayed on the windshields is particularly effective in promoting efficient cleaning, because it quickly softens oils, greases, and road tars on the windshield, which are substantially impervious to cold liquids. Ice, snow, and sleet are quickly and easily melted by the heated spray, or are so softened thereby that they can readily be removed by the wiper blades as they move over the windshield surfaces.

An incidental advantage of heating the spray liquid is that the windshields dry quickly after the wipers have wiped the sprayed liquid therefrom, and this, together with the fact that the dirt on the windshields is quickly loosened by the heated liquid, operates to eliminate a driving hazard by clearing the windshield completely in a very short time. The system of this invention can, therefore, be operated as frequently as necessary, as when driving through slush or in traffic on wet roads, or under storm conditions, without increasing the driving difficulties in any way whatsoever. Rather, the utilization of the cleaning arrangement of this invention materially reduces driving hazards under these conditions.

Turning now to Figure 4, the preferred form of pump to be included in the system of this invention is shown in section. The pump comprises an outer cylindrical body part 30, which may be threaded at its one end for receiving the closure member 32 that includes a central aperture within which a plunger 34 is movable. On one end of the plunger is the handle 36, and on the other end thereof is a piston arrangement 38. At the other end of the cylindrical body 30, there is a press formed closure member 40 which may be, as shown, welded to the body part at 42. The closure member 40 has a pair of spaced openings formed therein which receive the nipples 44, and which provide housings for receiving check valves 46. The check valves are spring pressed balls which seat against shoulders within the nipples 44, and the upper one thereof is the intake check valve, and the lower one is the discharge check valve. It will be evident that drawing the plunger 34 outwardly of the body 30 will cause the piston 38 to draw a vacuum on the conduit 12, thereby to draw liquid from the reservoir 10. Thereafter, inward movement of the plunger will move the piston inwardly to displace this liquid through the conduit 16 to the unit 18, and thence to the spray heads 24. The check valves 46 effectively prevent reverse flow during this operation.

Should it be desired, the piston 38 can carry a bumper spring 48, which cushions the last part of the inward movement of the piston and prevents damaging thereof by striking against the lower closure wall 40.

According to this invention, there is placed in the conduit 16 a valve generally indicated at 50, and which is operable for preventing any liquid from standing in the unit 18 or the conduit 22 after a cleaning cycle. This valve is best seen in Figure 3, where it will be observed that it comprises the body part 52 having an inlet port at 54 and a discharge port at 56, and which ports are controlled by a reciprocable valve member 58. A spring 60 normally urges the valve member 58 into the position shown in the drawings. In this position, the valve member interrupts communication between the ports 54 and 56, and, instead, establishes communication between port 56 and another port 62 in the valve body, which is connected to the atmosphere.

Optionally, the port 62 can be connected as by a conduit 64 with the container 10, so that liquid discharged through the said port will be returned to the container.

When the hand pump 14 is operated, the pressure which it builds up on conduit 16 acts on the upper surface of the valve member 58 and moves it downwardly. This movement of the valve member interrupts communication between ports 56 and 62 and establishes communication between ports 54 and 56. The pumped fluid thus passes from conduit 16 into the vaporizing unit 18. After a cleaning cycle, and when the pressure on the pumped fluid is released, the valve member 58 returns to its upper position, and connects the ports 56 and 62 so that all fluid remaining in the unit 18 and the conduit 22 can drain back to the reservoir 10 or be exhausted to the atmosphere.

The provision of this valve in the system prevents sputtering of steam and hot water from the spray heads after a cleaning cycle, and also insures that the conduit 22 and the spray heads will be completely drained and thereby eliminates the possibility that they will freeze-up and render the device inoperative, or, possibly break some of the elements of the system.

In some instances, it may be desirable to operate the pump by foot rather than by hand, and this may be accomplished by utilizing an inversion of the valve as shown in Figure 5. The body of the valve is indicated at 70, and the piston therein at 72. The inlet for the pump is indicated at 74 and the exhaust therefrom at 76, each of the last mentioned connections including check valves, similarly as the corresponding connections in the Figure 4 modification. When it is desired to place the system in operation, the vehicle operator actuates the pump by pressing on the foot button 78. This moves the piston downwardly in its cylinder against the spring 80 and draws fluid into the pump body through the conduit 74. After the operator releases the button 78, the spring 80 forces the piston back up in the cylinder, and discharges the fluid through the conduit 76 to the vaporizing unit of the system. In connection with the modification of Figure 5, it will be evident that the rate of operation of the pump, and which determines the character and temperature of the spray, is controlled by the tension of the spring 80, and that this spring would be so selected to give the pump the speed of operation which produced most satisfactory results.

Certain modifications will suggest themselves to those skilled in the art, such as the forming of the pump and container integrally in order to obtain a more compact assembly, or to arrive at a more inexpensive construction, or the mounting of the container itself in the position of the vaporizer unit 18, so that all of the liquid in the container would be heated all the time.

It will also be evident that the windshield cleaning system of this invention is adaptable for electric trolley buses and the like, merely by providing a different means for supplying heat to the unit 18. This could consist of an electric heater element specifically designed for that purpose and operated from the same source of power as the vehicle, or the unit 18 could be mounted adjacent some of the control resistors for the vehicle and derive heat therefrom.

It will be evident that the advantages of the heated liquid spray which makes the cleaning of the windshield more efficient and more rapid and which is effective for melting or softening snow and ice; the inexpensive pump arrangement which eliminates complicated and expensive vacuum and pressure operated devices common to the prior art; and the automatic drain valve which prevents liquid from standing in the conduits and the heating unit after a cleaning cycle has been completed, will still obtain in the case of any of the foregoing modifications.

It will be understood that this invention is susceptible to modification in order to adapt it to different usages and conditions, and, accordingly, it is desired to comprehend such modifications within this invention as may fall within the scope of the appended claims.

I claim:
1. In a liquid spray type windshield cleaning system; a nozzle for directing a spray against the windshield to be cleaned, a pump for forcing the spray liquid under pressure to the said nozzle, a heat exchanger connected between said pump and said nozzle operable to raise the temperature of liquid passing therethrough to the point of boiling, a drain conduit in said system, and a valve between said pump and said heat exchanger normally connecting said exchanger to said drain conduit and operable upon the development of pressure by said pump for interrupting said connection to said drain conduit and for connecting said heat exchanger so as to receive liquid displaced by said pump.

2. In a liquid spray type windshield cleaning system; a spray nozzle, a heat exchanger adapted to raise the temperature of water to the boiling point, a pump and a liquid container connected in series in the order named, said pump being arranged to draw fluid from the container and to force it through the heat exchanger and nozzle, a drain conduit in said system, and a drain valve associated with the heat exchanger and normally connecting said heat exchanger with said drain conduit, said valve being responsive to pressure developed on the discharge side of said pump for interrupting the connection to said drain conduit and establishing connection between said pump and said heat exchanger.

3. In combination with a vehicle having a windshield and an engine; a nozzle positioned in front of the windshield, a heat exchanger associated with the exhaust manifold of the engine adapted for heating water passing therethrough to the boiling point, a liquid container, a manually operable pump having its inlet connected to the container and its outlet connected through said heat exchanger with said nozzle whereby operation of said pump will force liquid from said container through said heat exchanger to said nozzle, and a valve connected between said pump and said heat exchanger, a drain conduit connected to said valve, said valve being responsive to pressure at the discharge side of the pump for disconnecting said heat exchanger from said drain conduit and for placing the same in communication with said pump.

FRED E. STUART.

REFERENCES CITED

The following references are of record in the file of this patent:

UNITED STATES PATENTS

| Number | Name | Date |
| --- | --- | --- |
| 2,126,624 | Eaddy | Aug. 9, 1938 |
| 2,260,904 | Horton | Oct. 28, 1941 |
| 2,318,529 | Sailer | May 4, 1943 |